(12) United States Patent
Keeler et al.

(10) Patent No.: US 6,384,723 B1
(45) Date of Patent: May 7, 2002

(54) DIGITAL COMMUNICATION SYSTEM AND METHOD

(75) Inventors: Manley S. Keeler, Naperville; Lee D. Tice, Bartlett; Robert J. Clow, North Aurora, all of IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/184,409

(22) Filed: Nov. 2, 1998

(51) Int. Cl.⁷ .............................................. G08B 29/00
(52) U.S. Cl. ...................... 340/513; 340/505; 340/509; 340/511; 340/512; 340/537; 340/661
(58) Field of Search ................................. 340/513, 505, 340/506, 512, 511, 509, 533, 537, 660, 661, 3.1; 324/500, 524

(56) References Cited

U.S. PATENT DOCUMENTS

| | | | |
|---|---|---|---|
| 3,735,396 A | 5/1973 | Getchell ..................... 340/505 |
| 4,023,163 A | 5/1977 | Krishnaiyer et al. ........ 340/534 |
| 4,276,642 A | 6/1981 | Siglow et al. .............. 370/513 |
| 4,377,781 A | * 3/1983 | Tatsushi et al. ............. 323/299 |
| 4,679,192 A | 7/1987 | Vanrabant ................... 370/438 |
| 4,703,452 A | 10/1987 | Abrant et al. ................. 714/12 |
| 4,754,262 A | 6/1988 | Hackett et al. ............. 340/525 |
| 4,885,568 A | 12/1989 | Hackett ...................... 340/505 |
| 4,899,131 A | * 2/1990 | Wilk et al. .................. 340/518 |
| 4,907,222 A | 3/1990 | Slavik ........................ 370/443 |
| 4,916,432 A | 4/1990 | Tice et al. ................... 340/505 |
| 4,991,123 A | 2/1991 | Casamassima ............. 340/525 |
| 5,117,219 A | 5/1992 | Tice et al. ................... 340/518 |
| 5,153,824 A | 10/1992 | Lalnne et al. ................. 700/79 |
| 5,400,009 A | 3/1995 | Kosich et al. .............. 340/331 |
| 5,473,771 A | 12/1995 | Burd et al. ..................... 714/4 |
| 5,475,696 A | 12/1995 | Taniguchi .................... 714/775 |
| 5,525,962 A | 6/1996 | Tice ............................. 340/505 |
| 5,535,251 A | 7/1996 | Sugawara .................... 375/356 |
| 5,559,492 A | 9/1996 | Stewart et al. .............. 340/331 |
| 5,598,139 A | 1/1997 | Karim et al. .......... 340/286.11 |
| 5,608,375 A | 3/1997 | Kosich .................. 340/286.05 |
| 5,668,531 A | 9/1997 | Sukegawa et al. .......... 340/506 |
| 5,673,252 A | 9/1997 | Johnson et al. ............. 370/449 |
| 5,751,210 A | 5/1998 | Kosich ........................ 340/326 |
| 5,809,289 A | 9/1998 | Bae ............................. 375/356 |
| 5,850,178 A | 12/1998 | Ha et al. ..................... 340/512 |
| 5,886,620 A | 3/1999 | Stewart et al. .............. 340/332 |
| 5,959,528 A | 9/1999 | Right et al. ................. 340/506 |
| 5,982,275 A | 11/1999 | Kosich ........................ 340/331 |

FOREIGN PATENT DOCUMENTS

| | | |
|---|---|---|
| GB | 2 072 467 A | 3/1981 |
| GB | 2 295 070 A | 5/1996 |

* cited by examiner

Primary Examiner—Donnie L. Crosland
(74) Attorney, Agent, or Firm—Welsh & Katz, Ltd.

(57) ABSTRACT

A communication protocol facilitates transmission at maximum rates for various types of cables. Signal to noise characteristics are improved by using voltage waveforms. The protocol can be used to transmit information between a common control unit and a plurality of spaced apart devices coupled thereto. Alternately, the protocol can be used for transmission of information between devices. The common control unit transmits clock pulses, while in a low impedance state. The devices respond to the clock pulses and transmit data on the communications link, in a low impedance state, when the common control unit has assumed a high impedance state. Clock signals and data signals are separated to improve signal to noise characteristics by transmitting same with opposite polarities. A clock detection circuit responds to the polarity of the clock pulses. A data detection circuit responds to the polarity of the data pulses.

71 Claims, 7 Drawing Sheets

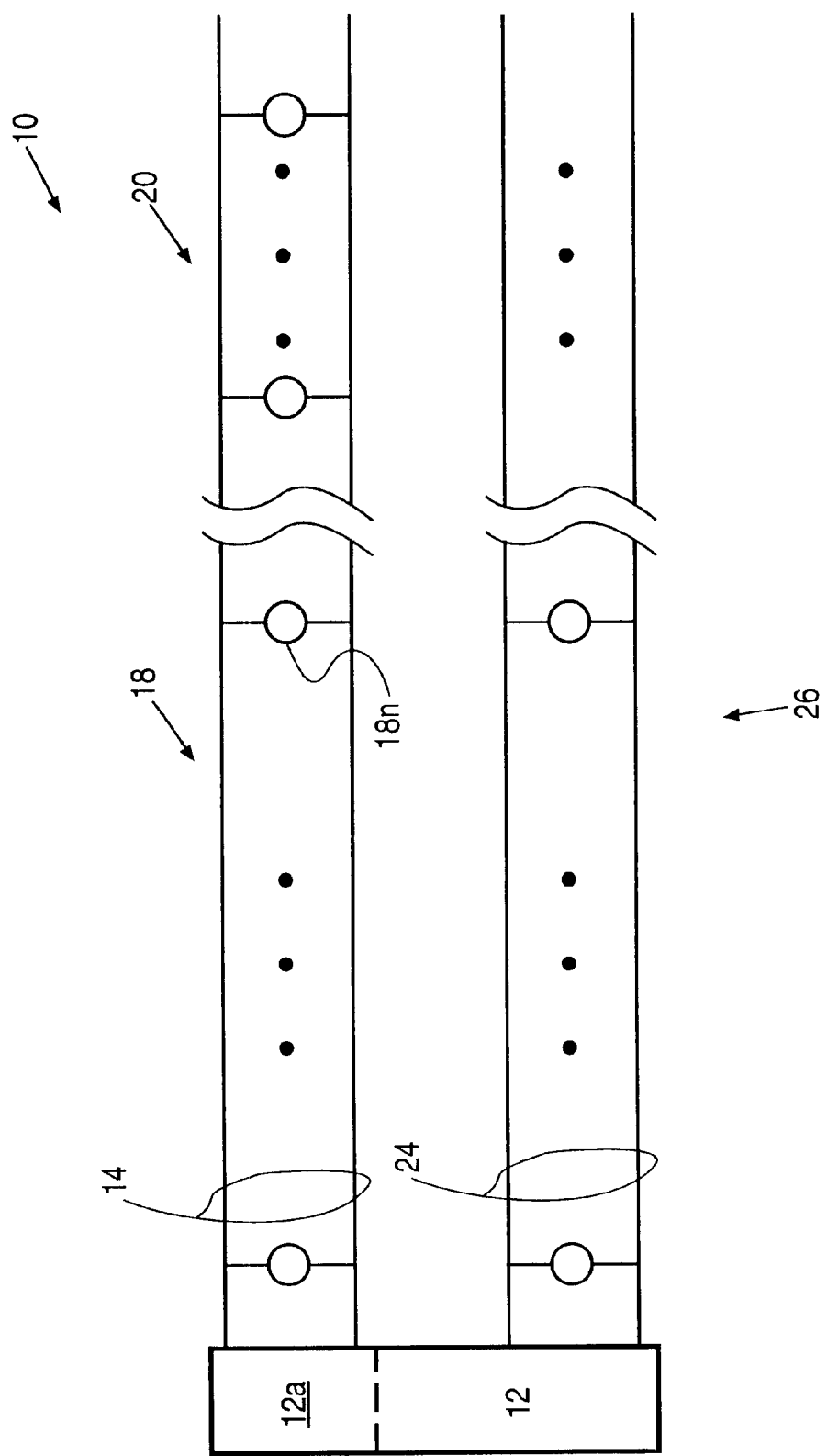

DIGITAL COMMUNICATION SYSTEM AND METHOD

FIELD OF THE INVENTION

The invention pertains to apparatus and methods for communicating signals between processors in multi-processor systems. More particularly, the invention pertains to such systems wherein the processors communicate with one another via a communications medium as in a local area network.

BACKGROUND OF THE INVENTION

Communications circuitry for use in multi-processor systems dedicated to monitoring or supervising regions is known. One example is disclosed in Tice et al U.S. Pat. No. 4,916,432 entitled Smoke and Fire Detection System Communication. Another is disclosed in Tice U.S. Pat. No. 5,525,962 entitled Communication System and Method. Both of the noted patents are assigned to the assignee hereof and are hereby incorporated herein by reference.

While known systems are useful and have been effective, it would be desirable to be able to more completely separate data from clock signals during the communication process. Further, it would be desirable to be able to provide a substantially collision free communication environment. Such an environment would be useful in supervision or alarm systems as well as in general purpose local area networks.

SUMMARY OF THE INVENTION

A communications apparatus utilizes multi-polarity, representations for clock and data pulses. Clock pulses are transmitted from a source in a first polarity, in a communications medium as voltage pulses. The source transmits clock pulses with a low output impedance. In-between clock pulses, the source switches to a high output impedance.

At least some of the data pulses are transmitted in a second polarity, on the medium, as voltage pulses. Most of the data pulses are bracketed by pairs of clock pulses.

In one aspect data pulses, for example representing a logical "one", can be transmitted as substantially constant width pulses with logical "zero" being represented by absence of a pulse. Alternately, data can be represented as variable width voltage pulses. A logical "one" can be transmitted with a first width and a logical "zero" transmitted with another width.

In one aspect, where the source corresponds to a common control element, energy can be supplied to a plurality of spaced part units coupled to the medium, at least, when the clock pulses are being generated by the control element. In this embodiment, data can be generated by the control element, with the second polarity or by another of the units coupled to the medium.

In yet another aspect, the control element can provide framing signals for messages along with the clock pulses to synchronize communications on the line.

Further, since the clock signals and the data signals are transmitted with different polarities relative to the medium signal-to-noise characteristics are improved. For example, if the first polarity is opposite the second polarity, the respective detection thresholds can be spaced further apart from one another, i.e., +2.5 volts and −2.5 volts, respectively. Finally, the polarity of a particular pulse also identifies the type of information, clock or data, represented by the pulse.

Other advantages include:

The clocking waveform and the device data waveform will never occur at the same time. This makes it possible to implement a lockout design in the detection circuit that will tend to prevent a false clock or data detection from "ringing" on the line during the driving of the clock and data voltage waveforms.

A device wired backwards will not short out the communication wiring. The system can determine which devices are wired backwards without interference with the devices that are wired correctly. (The system may be able to communicate to such devices without having to correct the wiring under certain conditions).

The ability to differentiate from a low impedance (causing a low voltage on the line) and data.

In order to minimize "ringing and other distortions" on the wiring during communications, an adjustable waveform shape can be driven from the power source for clocking. The "slew rate" or transition rate of the voltage from one level to another can be adjusted to compensate for various wiring configuration. This will tend to minimize distortion of the waveform during communications. This waveform adjustment will be a function of:

propagation times for the signals on the wiring due to lengths and characteristic impedances of the wires, errors occurring in the communications which is monitored by every device on the loop, and waveform analysis at a central point, most likely the power source for clocking.

In yet another aspect, bytes of data can be transmitted with single intervening clock signals. Alternately, transmission can be implemented with only a single synchronizing signal followed by a string of data such as one or more bytes.

Collision free communications can be accomplished by having the devices monitor the communication line voltages while they are transmitting. Any mismatch in voltage causes a transmitting device to drop off the line and wait for the next access period to start transmitting again.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 1 is a block diagram of a system in accordance with the present invention;

DETAILED DESCRIPTION OF THE PREFERRED EMBODIMENTS

Figure 1A:
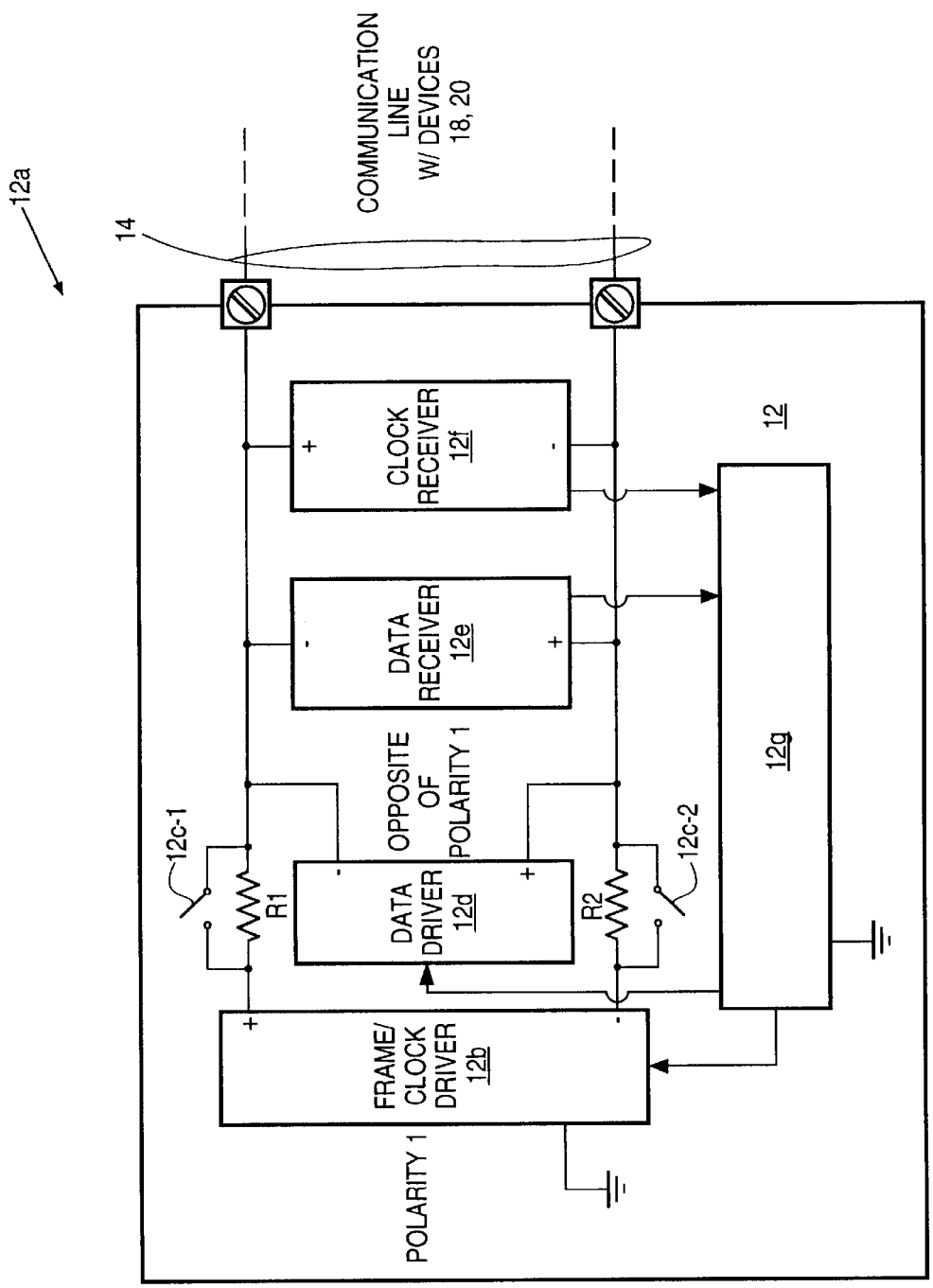
FIG. 1A is a block diagram of communication line interface circuitry.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a system 10 which can be used for monitoring a plurality of conditions in one or more regions to be supervised. The system 10 includes a common control unit 12 which could be implemented as one or more interconnected programmed processors and associated, prestored instructions.

The unit 12 includes an interface 12a for coupling, for example, to a communications medium 14, illustrated in FIG. 1 for exemplary purposes only as an optical or electrical cable.

Coupled to medium 14 is a plurality of ambient condition detectors 18 and a plurality of control or function units 20. It will be understood that the relative arrangement of the members of the pluralities 18 and 20 relative to the medium 14 is not a limitation of the present invention. The unit 12 can communicate with members of the pluralities 18 or 20, or these members can communicate among themselves using a protocol to be discussed subsequently.

The members of the plurality 18 can include intrusion sensors, position sensors, gas sensors, fire sensors such as smoke sensors, thermal sensors or the like, and gas sensors, all without limitation. The members of the plurality 20 can include solenoid actuated control or function implementing units, display devices, printers or the like.

Also coupled to the control unit 12 via a medium 24, illustrated for example as a pair of electrical cables, is a plurality 26 of alarm indicating output devices. These could include audible or visible output devices without limitation, speech output devices and the like. The devices 26 are intended to broadcast a message, which might indicate alarm conditions, in one or more predetermined regions.

FIG. 1A illustrates additional details of interface 12a. The interface includes frame/clock drive circuitry 12b which is coupled to controllable switches 12c-1, -2. Switches 12c-1, -2 provide a short circuit path, when closed, around relatively high impedance elements R1 and R2. Data drive circuitry 12d, data receive circuitry 12e and clock receive circuitry 12f are all coupled across communication link 14.

Interface 12a receives control signals from control element 12g which could be implemented with a programmed processor, associated preprogrammed instructions and interface circuits. It will also be understood that element 12g could receive via link 14, or any other selected input additional instructions, programs or data which could be stored therein for later execution or analysis, respectively.

In over-all operation, interface 12a via driver 12b provides framing and clock signals of a first polarity at a time when switches 12c -1, -2 are in a short circuit or closed state thereby presenting a low output impedance to the link 14. The clock receive circuitry 12f detects signal levels associated with clock pulses. It will be understood that the frame and clock signals impressed on the link 14 are voltage signals of a predetermined amplitude, for example 24 volts and 5 volts, respectively.

Interface 12a will switch to a high impedance output state, switches 12c-1, -2 effectively being open circuited, at a time when drive circuitry 12b is effectively outputting a zero volt signal. During this time interval data from units in pluralities 18 or 20 can be coupled to medium or link 14 with a second or different polarity, which could be opposite of the first polarity and received in data receive circuitry 12e. Alternately, during these time intervals interface 12a can transmit data via data drive circuits 12d to the members of the pluralities 18 or 20.

Data receive circuitry 12e includes one or more latches which retain data from the link 14 until reset. If a single latch is used, when the drive circuitry 12b sends the next clock pulse, that data latch can be reset. Resetting takes place when clock receiver circuitry 12f detects the next clock pulse. The final data value is retained in the storage element in receiver 12e and is reset at the start of the next frame. Where a plurality of data latches is provided, they could be reset simultaneously using a frame end signal.

Figure 2:
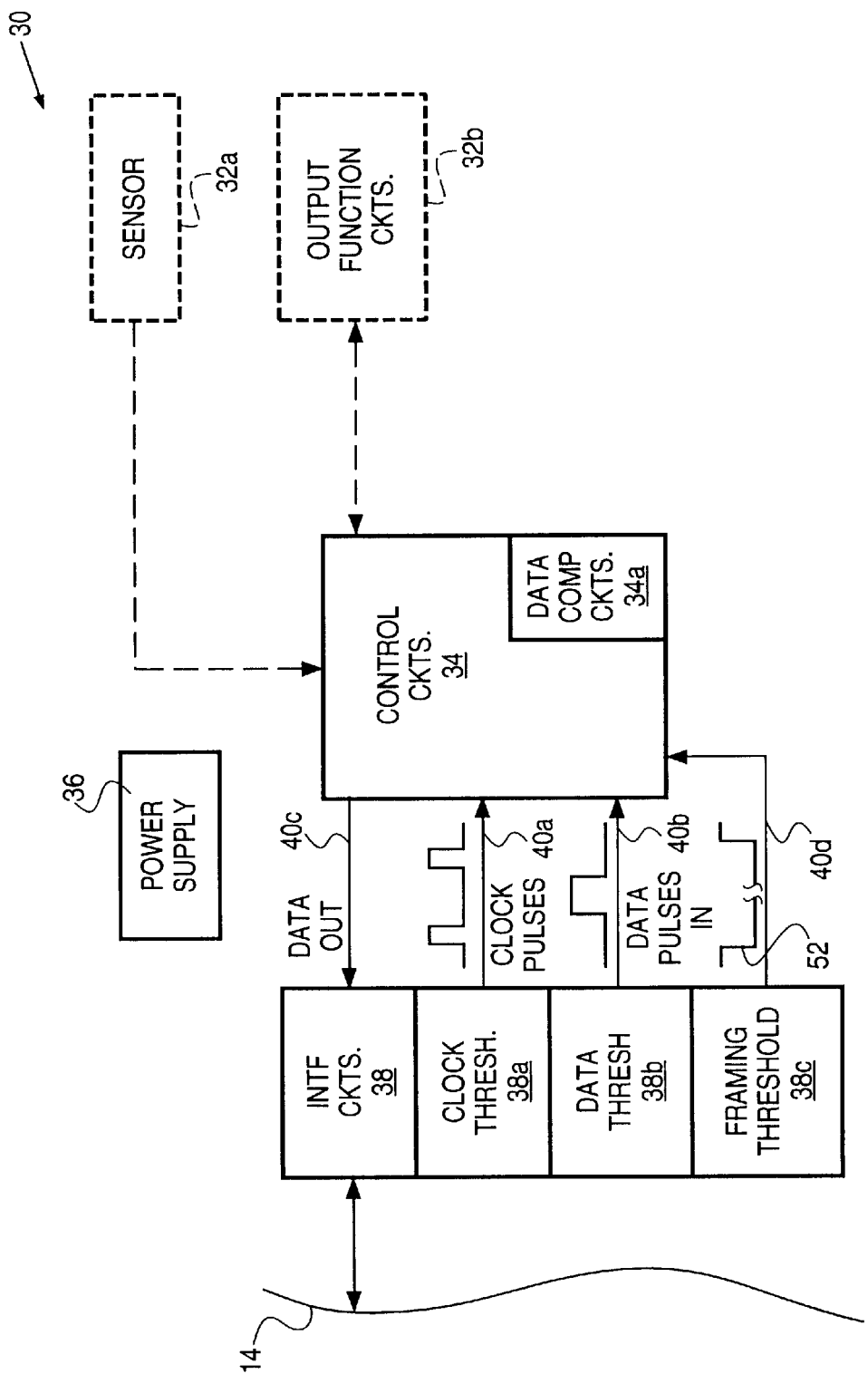
FIG. 2 is a block diagram of an electrical unit usable with the system of FIG. 1.

FIG. 2 illustrates an exemplary electrical unit 30 usable with the system 10. The electrical unit 30 could, without limitation, correspond to a member of the plurality of detectors 18. In this instance, the unit 30 would incorporate an appropriate sensor 32a, illustrated in phantom. Alternately, the unit 30 could correspond to a member of the plurality of function modules 20. In this instance, the unit 30 would include output function implementing circuitry 32b illustrated in phantom.

The unit 30 would also include control circuitry 34. The circuitry 34 could be implemented using one or more programmed processors in combination with other hardwired logic circuits.

The unit 30 also includes a power supply 36 which, is illustrated in FIG. 2, could receive electrical energy from the communications medium 14. That energy could in turn be made available to the components of the unit 30. Alternately, the unit 30 could contain a power supply energized via a battery or another source without limitation.

Unit 30 also includes an interface circuitry indicated generally at 38. The interface circuitry 38 facilitates bidirectional communication with communication signals on the medium 14. For purposes of communicating with the common control unit 12, any other member of the plurality 18 or the plurality 20 detection circuits 38a, 38b and 38c are also provided.

In accordance with the communications protocol provided on the medium 14, clock detection circuitry 38a detects those signals which have a first polarity relative to the communications medium 14. Threshold detection circuitry 38b detects those electrical signals which exhibit a second or opposite polarity relative to the medium 14. Circuitry 38c detects message framing signals.

Those signals detected by threshold circuitry 38a, clock pulses in accordance with the communications protocol system 10, can be presented on a line 40a to the control element 34. Additionally, those signals detected by circuitry 38b, in accordance with the protocol of the system 10, can be presented as data pulses on a line 40b. Control element 34 is also able to communicate via a line 40c and interface circuitry 38 with either the common control unit 12 or members of the plurality 18 or 20 without limitation.

Control circuitry 34 can also include data input/output comparison circuitry 34a. Circuitry 34a can be implemented in whole or in part using hardwired or programmed circuitry.

It will be understood that one use of the protocol herein is being discussed with respect to the system 10. However, the purpose or function of the system 10 is not a limitation of the present invention. The present protocol could be used with any distributed unit communication system without departing from the spirit and scope of the present invention.

Figure 3:
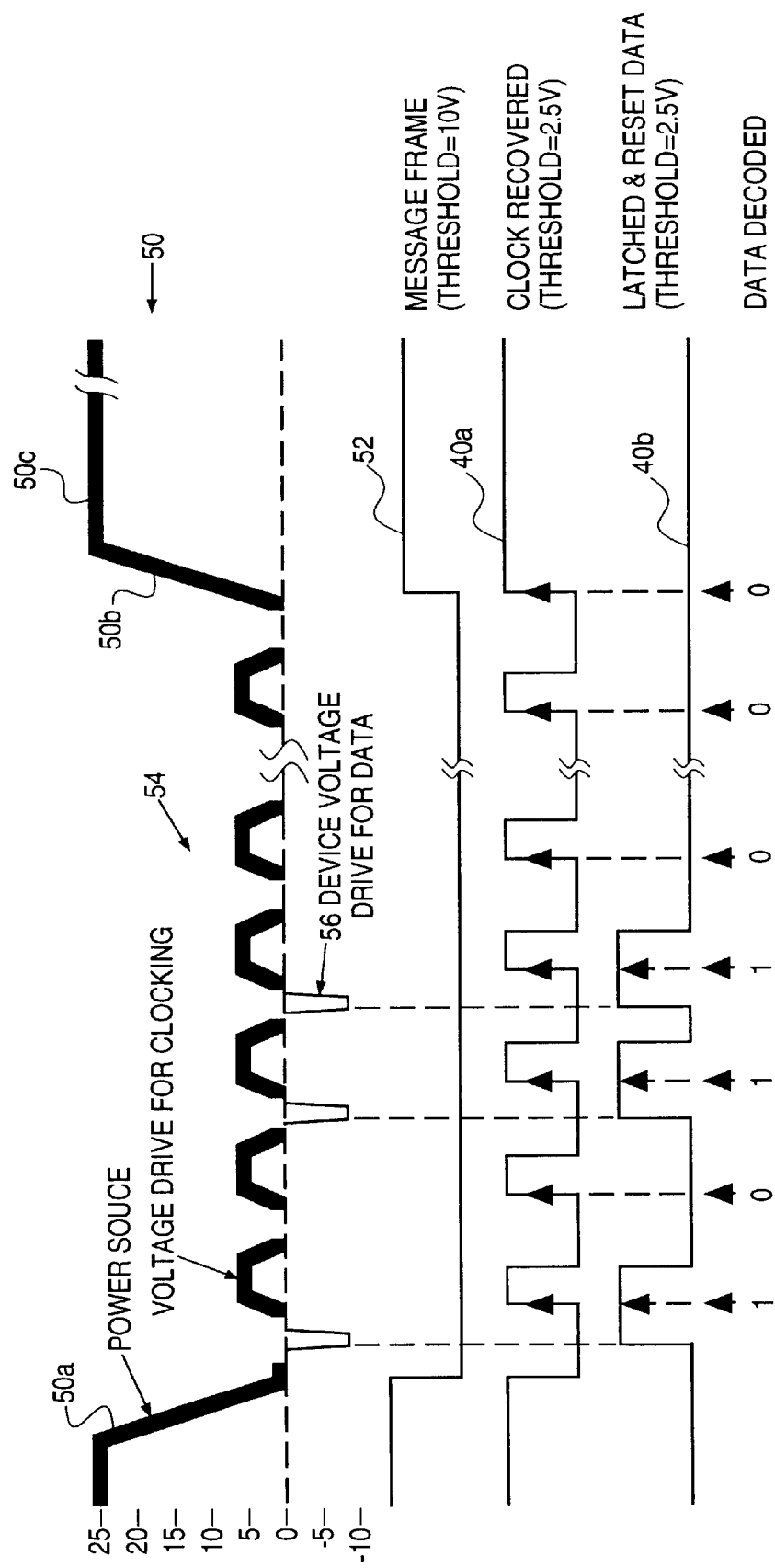
FIG. 3 is a set of timing diagrams illustrating a communications protocol usable with the system of FIG. 1.

FIG. 3 is a set of timing diagrams which further illustrates the communication protocol. A voltage signal 50 can be impressed upon the communications medium 14 by either control unit 12 or, if desired, one of the members of the pluralities 18 or 20.

The waveform 50 provides a message framing signal bounded by transitions 50a, indicating a message start and 50b indicating a message termination. Between message intervals, waveform 50, relative to the medium 14, exhibits a relatively high DC voltage level.

During inter-message intervals, waveform 50c could be coupled to the medium 14 via a power supply in unit 12 with a low output impedance. If desired, electrical energy can be supplied from the control unit 12 to the members of the pluralities 18 and 20 during these time intervals.

Interface circuitry 38c, for example in exemplary unit 30, is able to detect the start of a message indicated by framing signal 52. During a message frame, the voltage on medium 14 exhibits a relatively low value between message start transition 50a and message end transition 50b.

During the frame time interval, indicated by waveform 52, line 40d, the output power supply in the control unit 12 or any other unit which is providing framing signals must be capable of switching between high and low impedance states. As illustrated in waveform 50, the unit which is supplying synchronization signals which include the framing transitions 50a, 50b also provides a plurality of spaced apart voltage clock pulses indicated generally at 54. Clock pulses are transmitted on the medium 14 by output circuitry 12a with a low output impedance as discussed above.

During the time interval that each of the clock pulses is present on the medium 14, energy is also being supplied to those units, such as a unit 30 which have a power supply, such as power supply 36 coupled to the medium 14. The clock pulses 54 are all coupled to the medium with a first or positive polarity.

Between clock pulses, the synchronizing device assumes a high output impedance state. Other units, such as the common control unit 12 or members of the pluralities 18 or 20 can transmit voltage-type data pulses 56 on the medium 14 to be received by other members of the pluralities 18 and 20 as well as the control unit 12. During data intervals, those devices coupled to the medium 14 which are not transmitting data assume a high impedance state and can receive those data pulses. The data pulses 56 are transmitted on the medium 14 with a polarity which is different, or opposite, to the polarity of the clock pulses 54.

Impressing clock pulses on the medium 14 with a different polarity than that of the data pulses results in maximizing the receiving units' ability to separate clock and data pulses reliably. Since in the present protocol, clock signals and data signals are presented with different polarities, separation of the clock and the data can be carried out readily.

The detected polarity will determine which signals represent clock pulses and which signals represent data pulses. Additionally, the clock signals and the data signals, in accordance with the present protocol, will always occur at different time intervals. This contributes to an increased signal to noise ratio of the present system in that false clock signals or data signals resulting from ringing on the medium 14 can be rejected if the polarity of the noise signal does not correspond to the polarity of an expected clock or data signal.

The detected clock signals, present on the line 40a, and the displaced data signals, present on the line 40b, can then be coupled to control element 34 for processing at the unit 30. Alternately, the control unit 34 can generate a string of data pulses on the line 40c which can be transmitted via the medium 14 in-between clock pulses 54.

Figure 4:
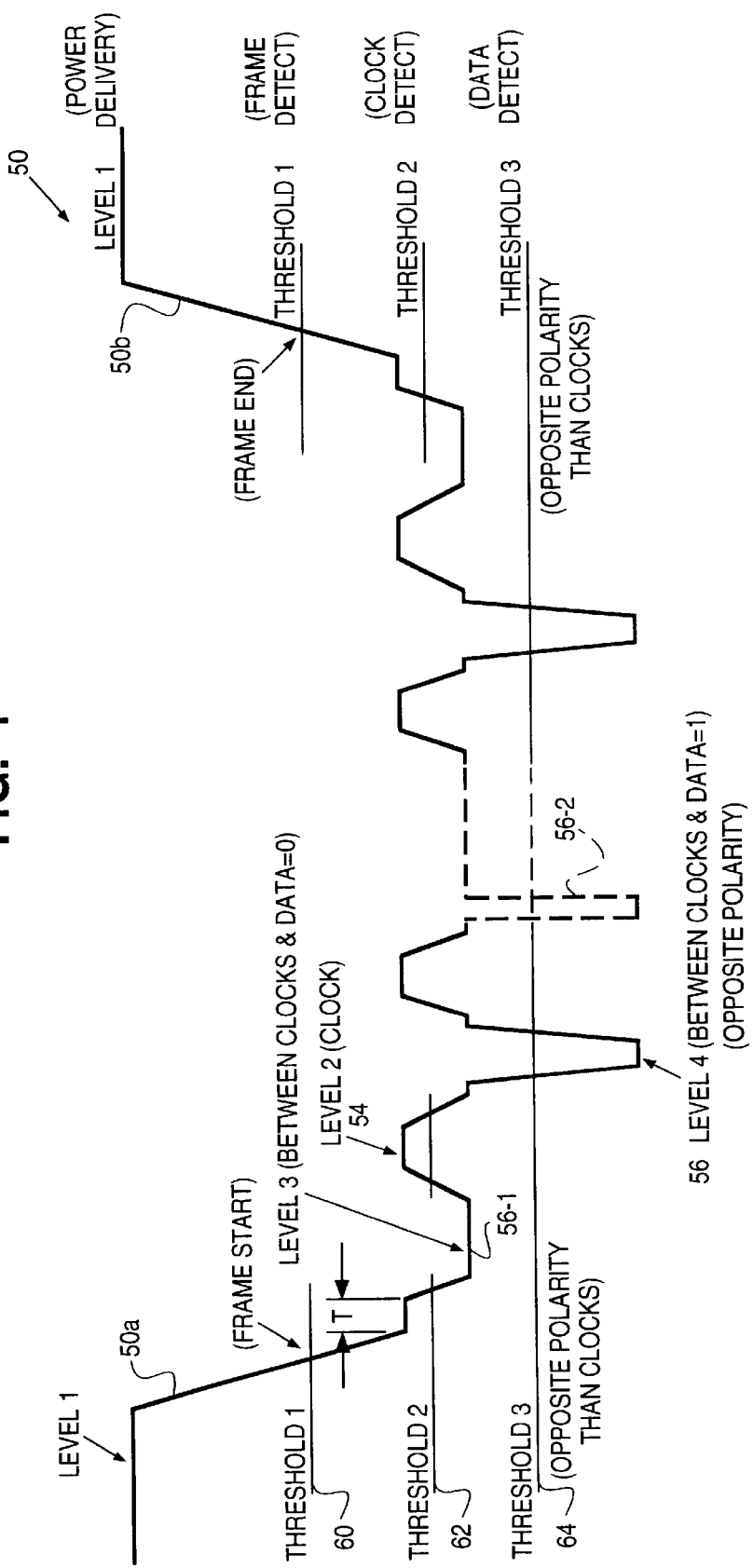
FIG. 4 is a more detailed diagram of a communication signal of FIG. 3.

FIG. 4 is a graph which illustrates further details of the signal 50 of FIG. 3. As illustrated in FIG. 4, the signal 50 exhibits a frame start/frame end threshold 60, detectable in framing threshold detection circuitry 38c. Signal 50 also exhibits a clock threshold 62 which can be used to detect the presence of the plurality of clock signals 54 via circuitry 38a.

A third threshold 64 functions to distinguish between a first polarity exhibited by the framing signals and the clock signals and a second, preferably opposite, polarity exhibited by a plurality of data signals 56. In one embodiment, where binary values are being transmitted via the medium 14, the presence of opposite polarity voltage pulses 56 could, for example, be indicative of the presence of logical 1. Logical zeros could be represented by an absence of the opposite polarity signals 56 as indicated at 56-1, FIG. 4.

Alternately, logical "one" signals can be transmitted as pulses 56 of a predetermined width. Logical "zero" can be transmitted, as indicated in phantom at 56-2, with a different width but of the same polarity as the pulses 56.

In addition, a stabilizing time interval T can be provided after frame start transition 50a and before a message starts such as before a data bit, such as 56-1, is transmitted. The stabilizing interval T can have a duration of less than 5 Msec, preferably in a range of 2–3 Msec.

Collision free communications can be enhanced by having the members of the pluralities 18 and 20 monitor the medium 14 when each respective device is carrying out a transmit operation. Detected voltage mismatches between the respective unit's intended communications sequence and that which is detected on the medium can cause the respective device to cease transmission and wait for the next framing interval to re-initiate transmission.

Circuitry 34a can compare a sequence of data output signals on line 40c to respective signals actually present on the medium 14 as detected by threshold circuitry 38b. Where a given data output pulse sequence differs from a pulse sequence present on the medium 14, that difference indicates to the respective electrical 30 that at least one other unit is attempting to communicate at the same time via medium 14.

Since a transmitting electrical unit transmits a voltage pulse, such as the pulses 56 with a low impedance output, the presence of one or more of those pulses on the medium 14 will override any respective output signals from other electrical units corresponding to, for example, a logical zero, 56-1 which are output via the respective electrical unit with a high impedance output state. Thus, the electrical unit which detects the mismatch can terminate communication temporarily until it detects a subsequent frame start signal and perhaps an associated command which will authorize further transmission on the medium 14.

The above described voltage drive protocol minimizes noise or losses due to leakage in the transmission medium 14. This would include leakage in conductive cables, wires or other sources of shunt impedance which might be present or cross the lines and not related to data transmission. By way of example, if the high level output impedance of the interface 12a corresponds to something on the order of 2000 ohms, since a transmitting electrical unit transmits at a very low output impedance state, even a shunt on the order of 100 ohms will not interfere with communications of data on the medium 14.

Thus, using the above-described protocol members of the plurality 18 can communicate information to members of the plurality 20 during message frames generated for example by common control unit 12. Alternately, and without limitation, the framing signals and clock pulses could be generated by any other electrical unit coupled to the medium 14.

It will be understood that neither the contents of the messages being transmitted nor the detailed circuitry of the members of the pluralities 18 or 20 are limitations of the present invention. It will also be understood that, if desired, the control unit 12 could, but need not, be the primary source of framing and clock signals in the system 10. In such an instance, the members of the pluralities 18 and 20 could communicate among themselves without directly communicating with the common control unit 12 but still operate within a synchronizing scheme established by that common control unit.

Figure 5:
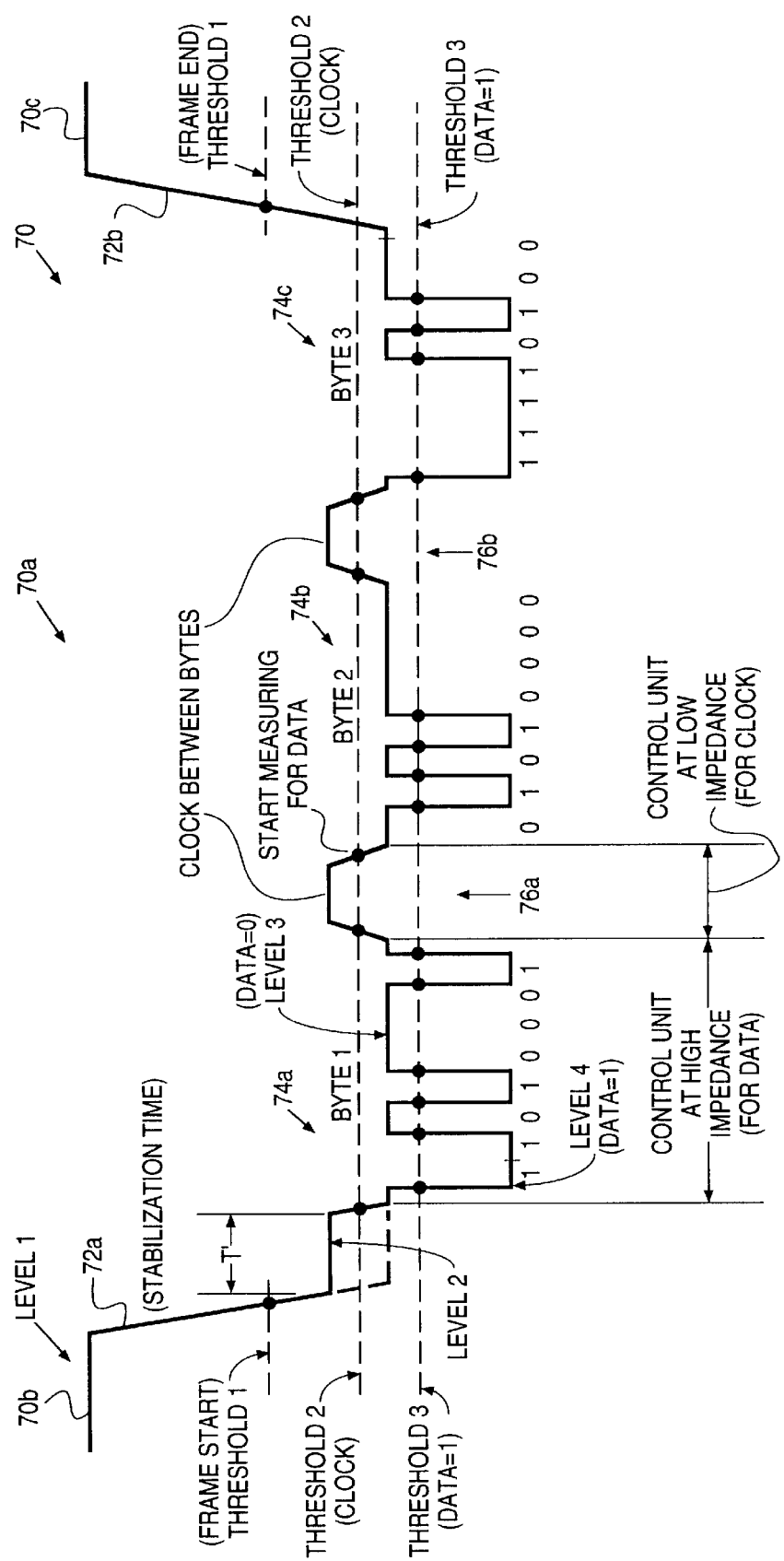
FIG. 5 is a diagram illustrating an alternate form of a communications signal.

FIG. 5 illustrates an alternate communication protocol exemplified by waveform 70. Waveform 70 includes a frame interval 70a bounded by a preframe voltage level 70b and a postframe voltage level 70c. During the preframe and postframe intervals, signals 70b, 70c provide energy to the pluralities of the devices such as devices 18 and 20.

Message frame 70a is defined by a frame start transition 72a and a frame ending transition 72b. Subsequent to frame start transition 72a, a stabilization time T' is provided. During this time interval between frame start transition 72a and any subsequent message or messages, any residual currents on the communication link 14 have an opportunity to dissipate or decrease to a level that will not interfere with communication of subsequent messages.

In the protocol of FIG. 5, a plurality of bytes 74a, 74b and 74c are serially transmitted between an end of the stabilization interval T' and frame end transition 72b. For synchronization purposes, interbyte clock pulses 76a and 76b are transmitted on the medium with a polarity opposite the polarity of the data pulses corresponding to a logical "one". Data signals corresponding to a logical "zero", as illustrated in FIG. 5, are transmitted at a level 3 amplitude.

During the stabilization time interval T' as well as during the clock pulses 76a, 76b, the source switches to a relatively low output impedance. The source then switches to a high impedance mode between clock signals thereby enabling communicating devices, such as members of the pluralities 18 and 20 to impress data signal voltage-type pulses on the link 14 with a polarity opposite that of the polarity of the clock signals.

Figure 6:
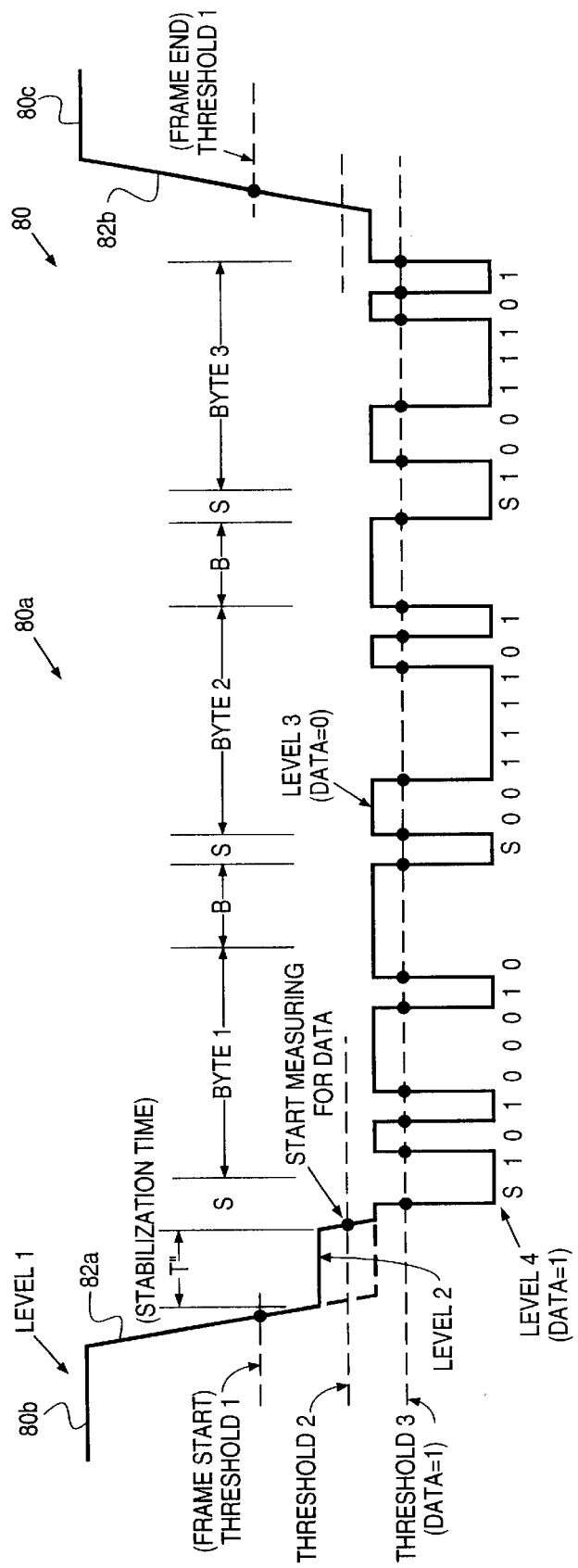
FIG. 6 is a diagram illustrating yet another form of a communications signal.

FIG. 6 illustrates via a waveform 80 an alternate communications protocol. Waveform 80 includes a message frame interval 80a which is bounded by a preframe level 80b and a postframe level 80c. During the intervals where the levels 80b, 80c are present, power can be supplied via medium 14 to the members of the pluralities 18 and 20.

Frame 80a is bounded by frame start transition 82a and a frame end transition 82b. Subsequent to frame start transition 82a, a stabilization time T" is provided, corresponding to the stabilization time interval T' discussed previously.

Unlike the protocol of FIG. 5, the protocol of FIG. 6 does not incorporate clock signals as previously discussed in FIGS. 4 and 5. Instead, at the end of stabilization interval T"', a data start signal S can be detected followed by an initial byte of information, a sequence of binary one and binary zero representations. Subsequently, an interbyte interval B is provided. Interval B is followed by another start signal S and a second byte of information represented by binary one and binary zero representations. After yet another interbyte interval B and another start signal S, a third byte of information can be transmitted in the same frame. The third byte is terminated by the frame end transition 82b.

Those of skill in the art will understand that the frame start transition 82a and the frame end transition 82b can be used as an alternate to having the clock signals 76a, 76b of the waveform 70 of FIG. 5. In this instance, frame start transition 82a could also enable a local clock of an appropriate frequency for clocking data signals.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A communication apparatus comprising:
   a voltage drive source;
   a multi-conductor communications medium, coupled to the source, wherein the source incudes drive circuitry for impressing on at least one of the conductors of the medium a plurality of spaced apart, voltage-type clock pulses of a first polarity relative to two of the conductors;
   an electrical device, coupled to the medium, wherein the device includes receiver circuitry for detecting the voltage-type clock pulses and for generating in the device electrical signals indicative thereof, wherein the device further includes transmitter circuitry for producing a plurality of spaced apart voltage drive data pulses on the at least one conductor, at least some of which are interspersed between respective pairs of clock pulses and having a second, different, polarity relative to the two conductors.

2. An apparatus as in claim 1 wherein, the device includes circuitry for establishing a common datum and wherein relative, to the common datum, the first polarity is the opposite of the second polarity.

3. An apparatus as in claim 1 wherein the source includes circuitry for generating the voltage clock pulses with a relatively low output impedance and for switching to a relatively high output impedance between clock pulses.

4. An apparatus as in claim 3 wherein the generating circuitry includes circuitry for generating first and second spaced apart bounding waveforms with the clock pulses positioned therebetween.

5. An apparatus as in claim 3 wherein the source intermittently provides electrical energy to the device.

6. An apparatus as in claim 5 wherein the generating circuitry generates bounding waveforms of the first polarity.

7. An apparatus as in claim 5 wherein the source provides electrical energy at least during clock pulses.

8. An apparatus as in claim 1 wherein the device contains an energy source and wherein the transmitter circuitry provides electrical energy to the at least one conductor from the energy source.

9. An apparatus as in claim 8 wherein the energy source is powered off of the medium.

10. An apparatus as in claim 4 wherein subsequent to one of the bounding signals, a medium settling delay is provided before transmission is initiated.

11. An apparatus as in claim 1 wherein the data pulses are transmitted with a substantially constant width.

12. An apparatus as in claim 1 wherein the data pulses are transmitted with at least first and second different widths.

13. A communication apparatus comprising
    a voltage drive source;
    at least a two-wire medium for communication, coupled to the source, wherein the source includes drive circuitry for impressing on the medium a plurality of spaced apart, voltage-type clock pulses of a first polarity across two of the wires;

an electrical device, coupled to the medium, wherein the device includes circuitry for detecting the voltage-type clock pulses and for generating in the device electrical signals indicative thereof;

wherein the device contains an energy source; and wherein the device further includes transmitter circuitry for driving the medium, from the energy source in the device, with a plurality of spaced apart voltage-type data pulses, and having a second, different polarity across the two wires.

14. An apparatus as in claim 13 wherein the source includes circuitry for generating voltage-type clock pulses with a relatively low output impedance and for switching to a relatively high output impedance between clock pulses.

15. An apparatus as in claim 14 wherein the generating circuitry includes circuitry for generating first and second spaced apart bounding waveforms with the clock pulses positioned therebetween.

16. An apparatus as in claim 14 wherein the device establishes at least one threshold detection level and includes circuitry coupled thereto to detect the clock pulses.

17. An apparatus as in claim 13 wherein the device establishes at least one threshold detection level and includes circuitry coupled thereto to detect the data.

18. An apparatus as in claim 13 wherein the source intermittently provides electrical energy to the device when a voltage across the two wires is higher than a predetermined level.

19. An apparatus as in claim 13 wherein the data pulses are transmitted with a substantially constant width.

20. An apparatus as in claim 13 wherein the data pulses are transmitted with at least first and second different widths.

21. An apparatus as in claim 13 wherein prior to transmission of any data pulses, a medium settling period is provided.

22. An apparatus as in claim 13 wherein prior to transmission of any clock pulses a medium settling time is provided.

23. An apparatus as in claim 15 wherein the generating circuitry includes delay circuitry for providing a medium settling time interval prior to initiating transmission of any clock and data signals.

24. A communications system interface circuit with first and second terminals comprising:

circuitry for providing temporally spaced apart framing signals at the terminals with an amplitude corresponding to a first voltage level, having a first polarity;

circuitry for providing a plurality of spaced apart first pulses at the terminals, between spaced apart framing signals, an amplitude less than the first voltage level and with the first polarity; and circuitry for receiving, at the terminals, spaced apart second voltage pulses, at least some of which are interspersed between pairs of first pulses, and having a polarity opposite that of the first polarity.

25. A circuit as in claim 24 which includes threshold establishing circuitry for detecting the second voltage pulses.

26. A circuit as in claim 25 which includes a power supply for providing electrical energy to the terminals simultaneously with the framing signals.

27. A circuit as in claim 24 which includes circuitry for establishing a selected voltage level with an amplitude between the amplitude of the first pulses and an amplitude of the second pulses, wherein the selected voltage level is temporally spaced between the first pulses and is present in the absence of the second pulses.

28. A circuit as in claim 24 which includes switching circuitry for providing the plurality of first pulses with a low output impedance.

29. An electrical unit comprising:

circuitry for detecting a transition of a voltage signal of a selected polarity through a first threshold thereby defining one of a framing signal start transition and a framing signal end transition;

circuitry for detecting at least one voltage transition through a second threshold, less than the first threshold, thereby defining one of a plurality of clock pulses;

circuitry for detecting at least one voltage transition through a third threshold thereby defining one of a plurality of data pulses wherein the data pulses exhibit an amplitude having a polarity opposite the polarity of the framing signals.

30. A unit as in claim 29 which includes a power supply wherein the power supply receives electrical energy from an exterior source in the presence of a selected signal.

31. A unit as in claim 30 which includes interface circuitry for coupling the unit to a communications link.

32. A unit as in claim 31 wherein the power supply receives electrical energy in the presence of the selected signal, from the link.

33. A unit as in claim 32 wherein the power supply transfers electrical energy to the link during selected time intervals.

34. In a communication system, a method of driving a waveform on a communication line comprising:

providing a start-frame indicator by altering a line voltage of a first polarity relative to a predetermined value;

generating clock pulse voltages with the first polarity and an amplitude that is different than the start frame indicator;

sending data pulses of a different polarity during the high impedance period of time;

providing an end-frame indicator for the message by returning the line voltage to the predetermined value.

35. A method as in claim 34 which includes:

switching to a high impedance state and decoupling from the communication line for a period of time between each clock pulse.

36. A method, as in claim 35, wherein the line voltage is driven to zero between each clock pulse prior to switching to the high impedance for decoupling a power supply from the communication line.

37. A method as in claim 35 where the devices coupled to the communication line exhibit a high impedance unless a selected device is transmitting a data value.

38. A method as in claim 34 wherein a stabilization period is provided immediately following the frame-start indicator prior to the first clock pulse.

39. A method as in claim 34 wherein multiple words are transmitted in the message.

40. A method as in claim 39 wherein one word in the message comprises an error detection check sum.

41. A communications method comprising:

generating a plurality of spaced apart voltage clock pulses, and transmitting the clock pulses with a first polarity in a low impedance state;

generating a plurality of voltage da pulses; transmitting at least some of the voltage data pulses with a second polarity, opposite the first polarity, interspersed between pairs of clock pulses, and in the presence of a relatively high impedance state.

42. A method as in claim 41 which includes:
providing a clock pulse transmitting source with high and low output impedance states and switching the source to the low impedance state when clock pulses are being transmitted and to the high impedance state when data pulses are being transmitted from a data source.

43. A method as in claim 41 wherein the clock pulses are bounded by framing signals with the first polarity.

44. A method as in claim 43 wherein clock pulses are detected with a threshold having the first polarity and wherein data pulses are detected with a different threshold having the second polarity.

45. A method as in claim 44 which includes providing electrical energy at least during the clock pulses.

46. A method as in claim 44 wherein the framing signals are detected with a third threshold, greater than the threshold but having the first polarity.

47. An electrical unit couplable to a bidirectional communication link, the unit comprising:
interface circuitry having at least first and second threshold detection circuits wherein the detected thresholds have one polarity and a third threshold detection circuit wherein the third threshold has a different polarity and wherein the polarities are relative to a selected, common communication line.

48. An electrical unit as in claim 47 which includes programmable control circuits, coupled to the interface circuitry, and an ambient condition sensor coupled to the control circuits.

49. An electrical unit as in claim 48 wherein the ambient condition sensor is one of a fire sensor, a position sensor and a motion sensor.

50. An electrical unit as in claim 47 wherein the interface circuitry includes circuitry having a high impedance state for receipt of signals from the link associated with the first and second thresholds and having a low impedance state for signals output to the link wherein the output signals are associated with the third threshold.

51. An electrical unit as in claim 47 which includes programmable control circuitry, coupled to the interface circuitry, and output function circuitry coupled to the control circuitry.

52. A communication system having a bidirectional communications medium comprising:
a plurality of electrical units wherein the medium enables a selected unit to communicate and the units each include communications interface circuitry, couplable to the medium, wherein that circuitry selectively exhibits a first output impedance and a second, lower output impedance wherein the interface circuitry includes drive circuitry for impressing a selected signaling voltage on the medium with the second output impedance; and detection circuitry for comparing a voltage on the medium to a voltage expected to be present on the medium and for terminating unit communication, at least temporarily, in response to a difference therebetween.

53. A system as in claim 52 wherein the units each include control circuitry for coupling a multi-state data bit sequence to the interface circuitry wherein one state corresponds to impressing the signaling voltage on the medium with the second output impedance and the other state corresponds to not impressing the signaling voltage and exhibiting the first output impedance.

54. A system as in claim 53 wherein at least some of the units include ambient condition sensors.

55. A system as in claim 54 wherein the control circuitry, in at least some of the units, includes a programmed processor.

56. A prioritizing process, usable with a plurality of energy supplying devices that communicate via a medium, the process comprising:
impressing, using energy from a communicating device, a discontinuous voltage sequence, corresponding to an indicator, on the medium wherein the sequence has at least two states;
comparing a discontinuous voltage sequence present on the medium to the impressed sequence, and, in response to a difference therebetween, terminating the process for a period of time.

57. A process as in claim 56 wherein the sequence is impressed on the medium with first and second output impedances wherein one output impedance corresponds to one of the states, wherein the presence of a selected voltage value is associated with a lower output impedance value and another voltage value is associated with a higher output impedance value.

58. A process as in claim 57 which includes coupling electrical energy to the medium while in the lower output impedance state.

59. A process as in claim 56 which includes impressing at least two independent discontinuous voltage sequences, corresponding to respective different indicators, on the medium; comparing a sequence actually present on the medium with each of the impressed sequences and, in response to a detected difference between the sequence present on the medium and a respective one of the independent sequences, terminating the impressing step with respect to that sequence.

60. A process as in claim 59 which includes intermittently coupling electrical energy to the medium during the impressing step.

61. A communication system which provides an access time for messages with multiple devices capable of transmitting information via a communications medium at the same time during the access time, the system comprising:
a plurality of devices each having circuitry capable of transmitting a signal on the communication medium including circuitry in the devices for monitoring the communication medium, and including energy storage circuits in at least some of the devices and wherein stored energy in the devices is used to transmit a voltage signal on the communication medium and where the devices wait to start transmitting until an access time is provided;
decision logic in the devices to stop transmitting during the access time if a mismatch occurs; and wherein
if a device stopped transmitting because of a mismatch, that device will retry transmitting during the next access time.

62. A system as in claim 61 wherein at least some of the devices include ambient condition sensors.

63. A system as in claim 61, wherein the devices include circuitry to transmit a message using a synchronized access start time.

64. A system as in claim 61, Wherein a respective device stops trying to transmit a message once the devices complete their message without a mismatch.

65. A system as in claim 61, where the device transmissions are in response to a group message requesting a group of devices to respond with a message.

66. A system as in claim 64, where the devices include circuitry to again try to send a message at least once all other messages from other devices are completed without a mismatch.

67. A system as in claim 64, wherein at least some of the devices again try to send a respective message if a new message is established in the device.

68. A communications apparatus comprising:

a voltage drive source;

at least a two wire communications medium, coupled to the source, wherein the source includes drive circuitry for impressing on the medium a plurality of voltage-type frame defining signals wherein during a defined frame information can be transmitted on the medium and wherein delay circuitry provides a medium settling delay at the beginning of a defined frame and before any information is transmitted.

69. An apparatus as in claim 68 which includes signal generating circuitry for, subsequent to the delay, transmitting a data interval start signal on the medium.

70. An apparatus as in claim 68 which includes circuitry, coupled to the medium for transmitting a plurality of spaced apart voltage-type data pulses with a polarity relative to a selected reference, opposite that of the frame defining signals.

71. An apparatus as in claim 68 which includes clock generation circuitry for generating on the medium at least one clock pulse between selected data pulses wherein the clock pulses have a polarity opposite that of the data pulses.

* * * * *